United States Patent
Suzuki

(10) Patent No.: US 6,496,484 B1
(45) Date of Patent: Dec. 17, 2002

(54) ROUTING ADDRESS MANAGEMENT METHOD AND SYSTEM

(75) Inventor: Yuichi Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/382,206

(22) Filed: Aug. 23, 1999

(30) Foreign Application Priority Data

Aug. 21, 1998 (JP) .......................................... 10-235630

(51) Int. Cl.$^7$ .............................................. H04L 12/26
(52) U.S. Cl. ...................................... 370/254; 370/475
(58) Field of Search .................................... 370/254, 255, 370/256, 257, 258, 328, 338, 349, 395.31, 401, 475; 709/220, 221, 222, 249, 252

(56) References Cited

U.S. PATENT DOCUMENTS

| | | | |
|---|---|---|---|
| 5,185,860 A | * 2/1993 | Wu | 709/224 |
| 5,778,058 A | * 7/1998 | Gavin | 370/254 |
| 5,812,531 A | * 9/1998 | Cheung et al. | 370/255 |
| 6,075,776 A | * 6/2000 | Tanimoto et al. | 370/254 |

FOREIGN PATENT DOCUMENTS

| | | |
|---|---|---|
| JP | 61-84140 | 4/1986 |
| JP | 1-101750 | 4/1989 |
| JP | 1-129550 | 5/1989 |
| JP | 2-214349 | 8/1990 |
| JP | 3-141754 | 6/1991 |
| JP | 4-154335 | 5/1992 |
| JP | 10-23056 | 1/1998 |

* cited by examiner

*Primary Examiner*—Kwang Bin Yao
(74) *Attorney, Agent, or Firm*—Foley & Lardner

(57) ABSTRACT

A routing address management method providing a rapid update of an address learning table in each routing node is disclosed. When a routing node determines that a new host is connected to a network thereof, an address learning table thereof is updated and thereafter an update notifying message including the new address information is sent to a routing server. The routing server in response to the update notifying message sends an update request message to the routing nodes other than the routing node. The routing nodes other than the routing node updates address learning tables thereof depending on the new address information included in the update request message.

13 Claims, 6 Drawing Sheets

RN:ROUTING NODE

RN:ROUTING NODE

ROUTING ADDRESS MANAGEMENT METHOD AND SYSTEM

BACKGROUND OF THE INVENTION

1. Field of the Invention

The present invention generally relates to a network system composed of a plurality of local-area networks (LANs) connected by a plurality of routing nodes and in particular to a routing address management techniques using an address learning table when a new host is connected to a LAN or a host moves from a LAN to another LAN within the network.

2. Description of the Related Art

A routing node connecting a LAN with another LAN is allowed to recognize a host connected to a LAN by monitoring the source address (SA) of data frame flowing on each of the LANS. More specifically a routing node is provided with an address, learning table containing address information for each host. Therefore, in the case where a new host is connected to a LAN or an existing host is moved to another LAN, the routing node can recognize the host by referring to the address learning table. Each routing node can manage the address information of the hosts using the address learning table. Further, by the routing nodes referring to the address learning tables thereof, efficient data frame transfer can be achieved in the network.

It is necessary to update such an address learning table when a new host is connected to a LAN or an existing host is moved to another LAN. There have been proposed several methods for automatically updating the address learning table.

According to a first conventional example, a bridge devica connecting a plurality of LANs is provided with an address learning table. In the case where an existing terminal moves from a first LAN to a second LAN, the bridge device searches the address learning table for the source address of a data frame received from the terminal. If the same address is found, the registered address information is deleted from the address learning table and the new address information indicating that the terminal is connected to the second LAN is registered onto the address learning table. In this way, the address learning table is updated when a terminal moves from a LAN to another LAN. Such a first conventional method has been disclosed in Japanese Patent Unexamined Publication No. 4-154335.

According to a second conventional example, a bridge device is provided with an address learning table and a server stores a duplication of the address information of the address learning table at regular intervals. The server uses the duplication to check the location of a mobile host. In the case where the server receives no response to the check operation from the mobile host, the server determines that the mobile host has moved to anther LAN and instructs the bridge device to delete the address information for the mobile host from the address learning table. Thereafter, when receiving a response to a check operation from the mobile host, the new address information of the mobile host is registered onto the address learning table. Such a second conventional method has been disclosed in Japanese Patent Unexamined Publication No. 10-23056.

However, the first conventional method does not provide a means for informing other bridge devices of the update of the address devices. According to the second conventional method, it is necessary for the server to instruct the bridge device to perform a deletion operation and, if receiving the response then to perform a registration operation. Therefore, there are cases where the status of the address learning table is different from one bridge device to another. Further, the two operation steps cause the processing time to become longer.

SUMMARY OF THE INVENTION

An object of the present invention is to provide a routing address management method and system which can update the address learning table of each routing node in a short time.

Another object of the present invention is to provide a routing address management method and system which can reduce the number of control messages, resulting in reduced traffic in the network system.

Still another object of the present invention is to provide a routing address management method and system which can reduce the burden of a routing server in the network system.

According to the present invention, in a network system including a plurality of hosts and a plurality of networks which are connected by a plurality of routing nodes each having an address learning table storing address information for each of the hosts, wherein each of the hosts can be connected to one of the networks, a routing address management method includes the following steps:

at a routing node, monitoring a network connected to the routing node to determine whether a new host is connected to the network; when it is determined that a new host is connected to the network, updating an address learning table thereof depending on new address information of the new host; producing a control message including the new address information after the address learning table has been updated; and at the routing nodes other than the routing node, updating address learning tables thereof depending on the new address information included in the control message.

According to another aspect of the present invention, in a network system including a routing server, a plurality of hosts, and a plurality of networks, a routing node monitors a network connected to the routing node to determine whether a new host is connected to the network. When it is determined that the new host is connected to the network, an address learning table thereof is updated depending on new address information of the new host. After the address learning table has been updated, an update notifying message including the new address information is sent to the routing server. The routing server, in response to the update notifying message, sends an update request message to the routing nodes other than the routing node, the update request message including the new address information of the new host. The routing nodes other than the routing node updates address learning tables thereof depending on the new address information included in the update request message.

Preferably each of the routing nodes other the routing node sends an update completion message to the routing server when an address learning table has been updated.

The routing server preferably starts a timer set for a predetermined time period when the update request message is sent and determines whether the update completion message is received from each of the routing nodes other than the routing node. The update request completion message is not received until the predetermined time period has elapsed. The timer is stopped when the update completion message has been received from each of the routing nodes other than the routing node.

According to a still another aspect of the present invention, in a network system including a plurality of hosts and a plurality of networks which are connected by a plurality of routing nodes each having an address learning table storing address information for each of the hosts, wherein each of the hosts can be connected to one of the networks, a routing node monitors a network connected to the routing node to determine whether a new host is connected to the network. When it is determined that the new host is connected to the network, an address learning table thereof is updated depending on new address information of the new host. Then an update request message is sent to the routing nodes other than the routing node after the address learning table has been updated. The update request message includes the new address information of the new host. The routing nodes other than the routing node updates address learning tables thereof depending on the new address information included in the update request message.

As described above, in each of the routing nodes, deletion of old address information and registration of new address information are both performed at a time in the address learning table thereof, resulting in the reduced time required for updating the address learning table of each routing node and the reduced burden on the routing node or the routing server.

Further, since a single message is used to delete the old registered address information and register the new address information in the address learning table in each routing node, the address information update in each routing node is made reliable and the traffic in the network system can be reduced. Furthermore, the reduced burden on the routing server can be achieved.

DETAILED DESCRIPTION OF THE PREFERRED EMBODIMENTS

Figure 1:
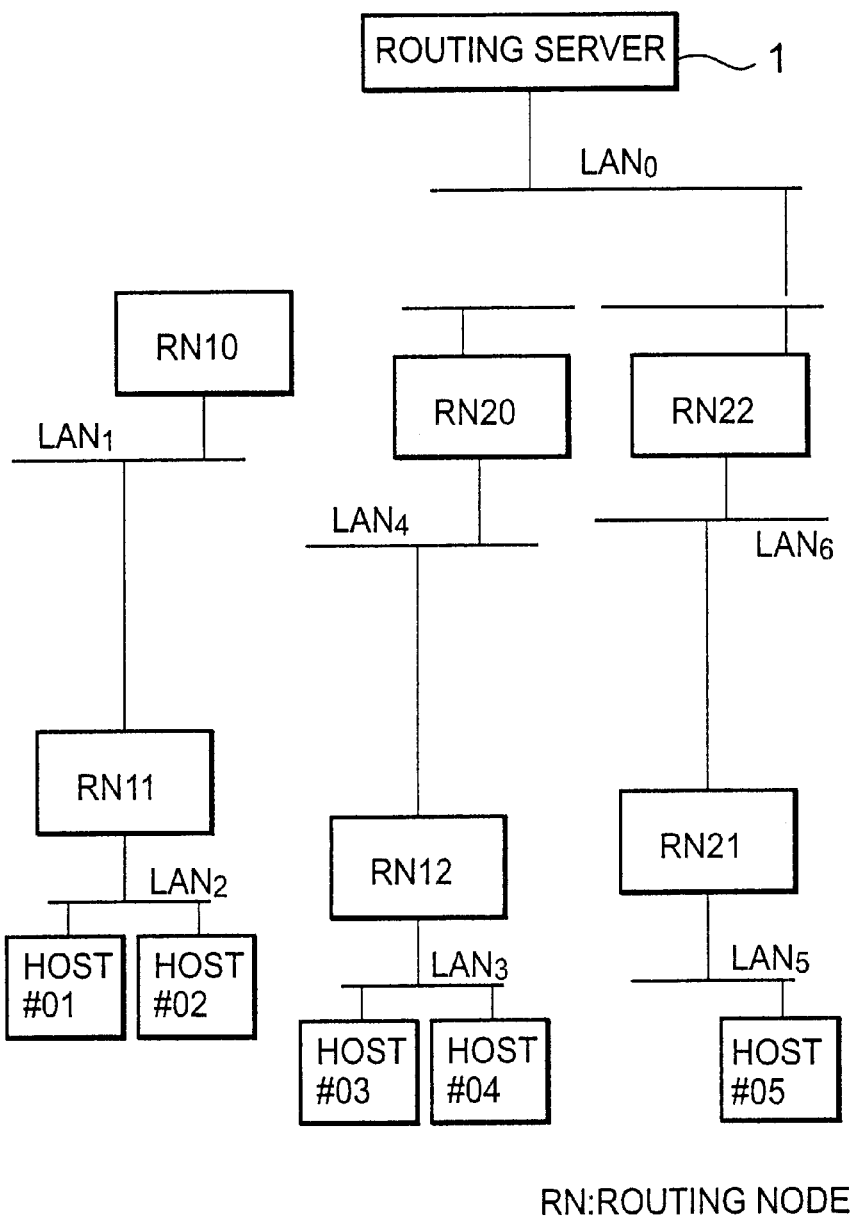
FIG. 1 is a schematic diagram showing an example of a network system employing a routing address management method according to the present invention.

Referring to FIG. 1, a network system is composed of a routing server 1, a plurality of routing nodes, and a plurality of hosts. Hereinafter, for simplicity, assuming six routing nodes RN10–RN12 and RN20–RN22 and five hosts #01–#05 are illustrated in FIG. 1. Each routing node connects different LANs each connecting a plurality of hosts. In this embodiment, each of the hosts is a mobile terminal which can be connected to any of the LANs. For example, the host #01 is connected to the $LAN_2$ which is connected to another $LAN_1$ through the routing node RN11. The host #01 can be moved from the $LAN_2$ to the $LAN_5$.

Figure 2:
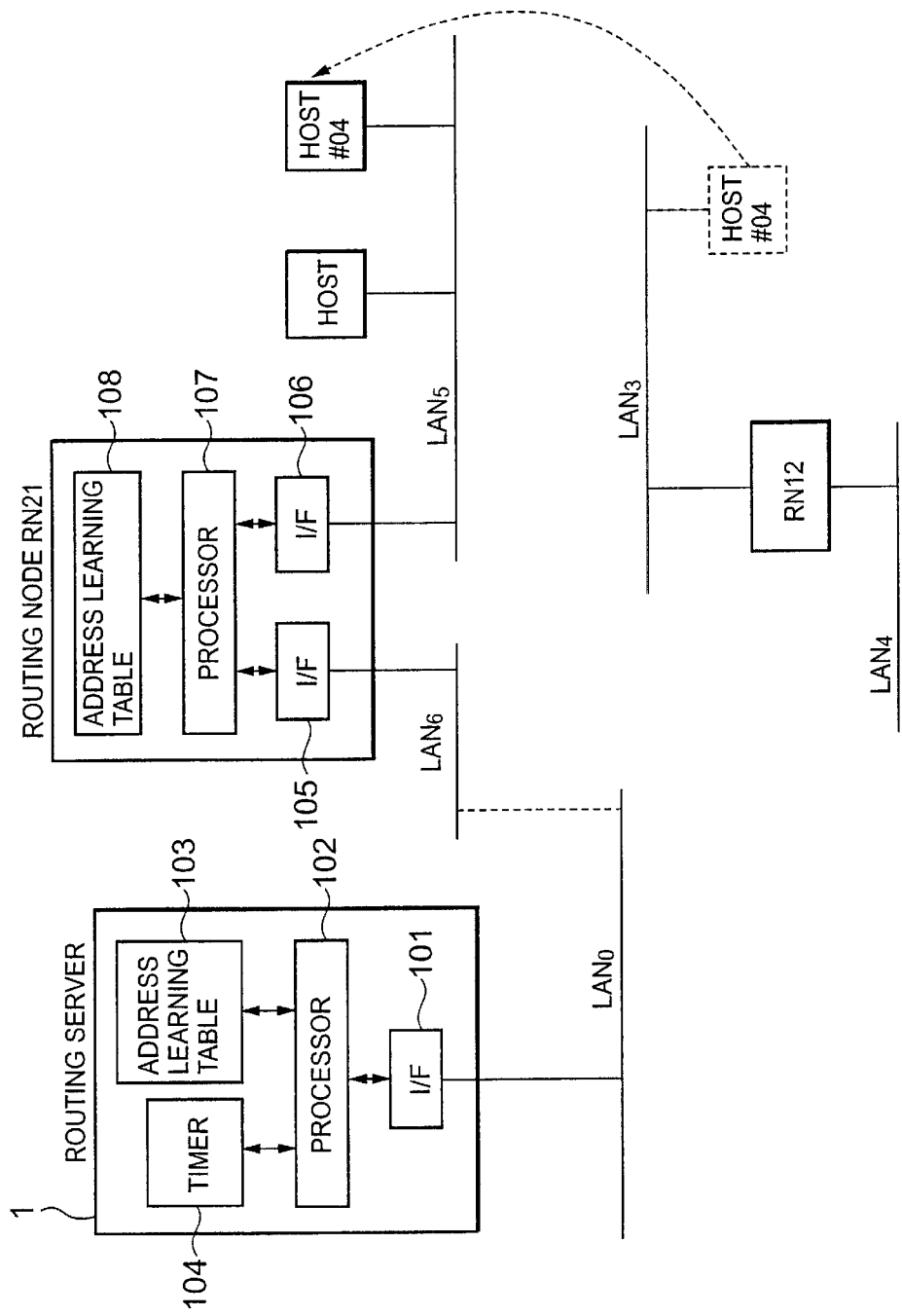
FIG. 2 is a detailed block diagram showing the network system for explanation of a first embodiment of the routing address management method according to present invention.

Referring to FIG. 2, the routing server 1 includes an interface to the $LAN_0$, a processor 102, an address learning table 103, and a timer 104. The processor 102, may be a program-controlled processor such as a CPU. A routing address management program for server runs on the processor 102 to perform routing address management as will be described later. The address learning table 103 retrievable stores address information for each host including the identification and location information of the host. The timer 104 is used as a watchdog timer to measure a predetermined time period.

The routing node (here, $RN_{21}$) includes interfaces 105 and 106 respectively to $LAN_6$ and $LAN_5$, a processor 107, and an address learning table 108. The processor 107 may be a program-controlled processor such as a CPU. A routing address management program for routing node runs on the processor 107 to perform routing address management as will be described later. The address learning table 108 retrievably stores address information for each host including the host address and location information of the host. The other routing node $RN_{21}$. The host address is uniquely assigned to each of the hosts. A host sends a data frame including its host address.

hereafter, a first embodiment of the present invention will be described taking the network system shown in FIGS. 1 and 2 as an example.

Figure 3:
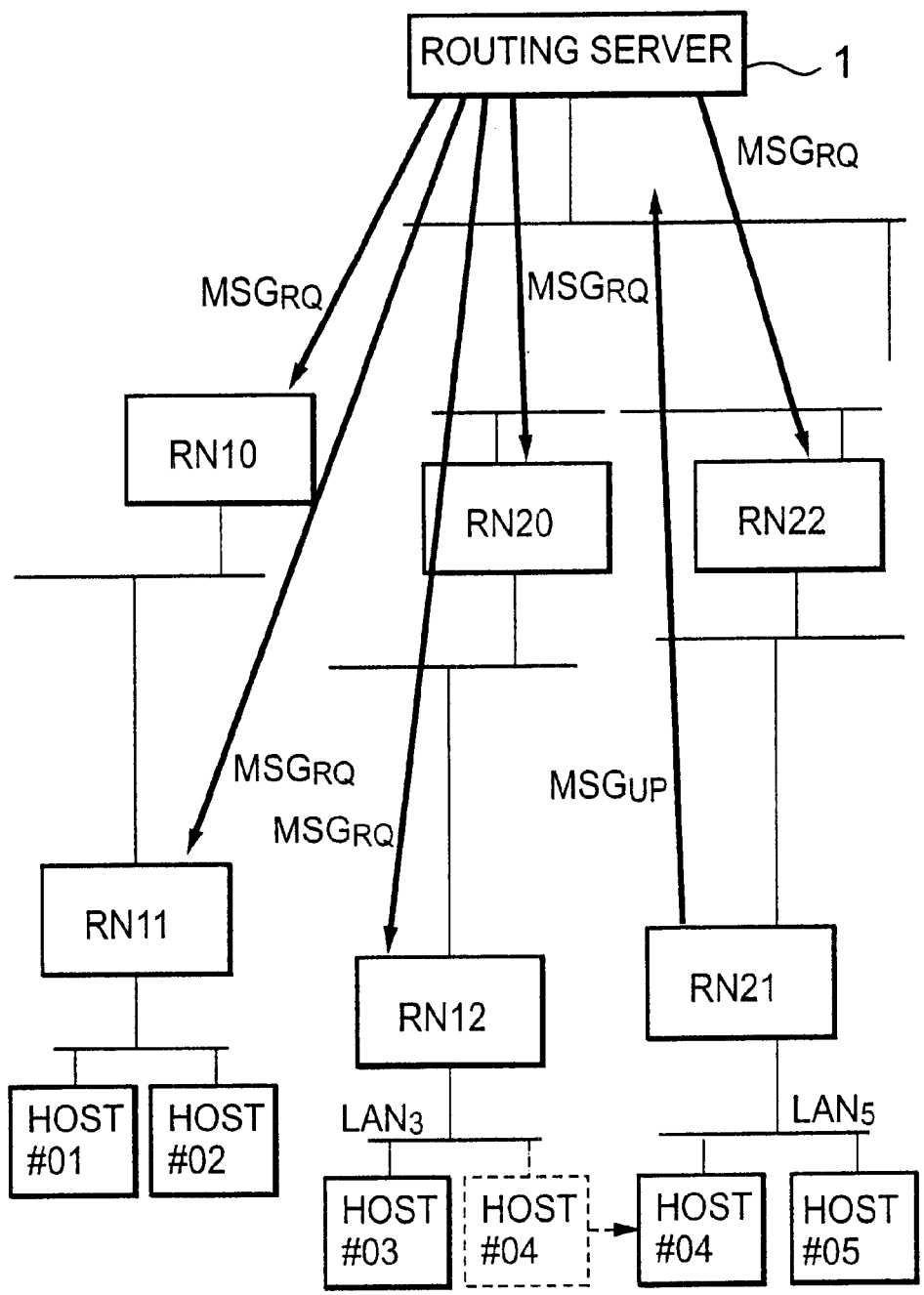
FIG. 3 is a schematic diagram showing an operation of the first embodiment.

Referring to FIG. 3, consider the case where a host #04 is disconnected from the $LAN_3$ and then is connected to the $LAN_5$, for example. In this case, when the routing node RN21 learns from the address learning table 108 that the host #04 does not belong to the $LAN_5$, the routing node RN21 sends and update notifying message $MSG_{UP}$ to the routing server 1. When receiving the update notifying message $MSG_{UP}$ from the routing node RN21, the routing nodes other than the routing node RN21 which has sent the update notifying message $MSG_{UP}$. The update request message $MSG_{RQ}$ includes the host address and the location information of the LAN to which the host is now connected. Each of the other routing nodes updates the address learning table thereof depending on the update request message $MSG_{RQ}$. In this way, it is possible to update the address learning tables of all the routing nodes at a time. The details of the operation will be described hereinafter, taking a location change of the host #04 as an example.

Figure 4:
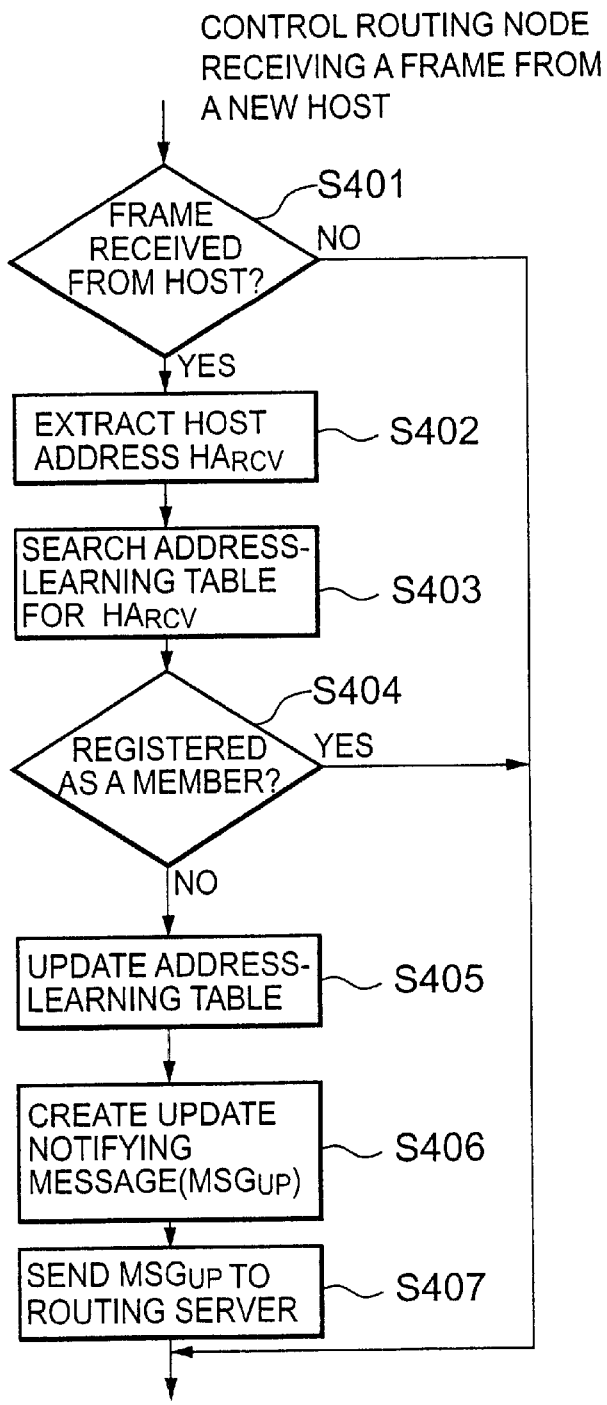
FIG. 4 is a flowchart showing a control operation of a routing node receiving a data frame from a new host according to the first embodiment.

Referring to FIG. 4, after the host #04 has been connected to a new $LAN_5$, the host #04 (YES in step S401), the processor 107 extracts a host address $HA_{RCV}$ from the data frame (step S402) and starts searching the address learning table 108 for the host address $HA_{RCV}$ (step S403). If the received host address $HA_{RCV}$ is a new member. Therefore, the processor 107 updates address learning table 108 such that the host #04 belongs to the $LAN_5$ (step S405).

After the address learning table 108 has been updated, the processor 107 creates an update notifying message $MSG_{UP}$ including the host address $HA_{RCV}$ of the host #04 and the location information $L_{LAN}$ of the $LAN_5$ (step S406). Then the update notifying message $MSG_{UP}$ is sent to the routing server 1) step S407).

Figure 5:
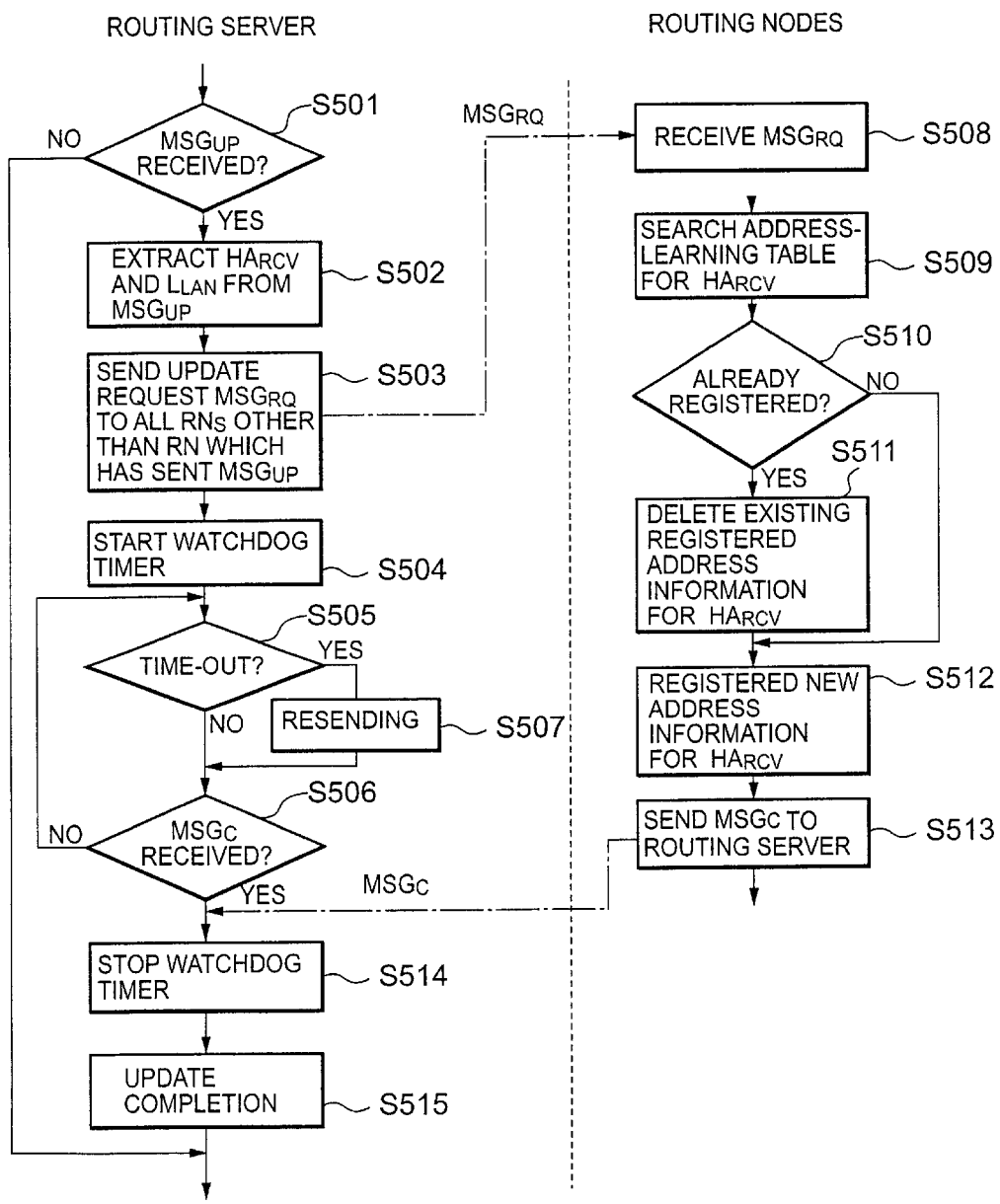
FIG. 5 is a flowchart showing a combination of control operations of a routing server and a routing node according to the first embodiment.

Referring to FIG. 5, when the routing server 1 raceives the update notifying message $MSG_{UP}$ from the routing node (YES in step S501), the processor 102 of the routing server 1 extracts the host address $HA_{RCV}$ of the host #04 and the location information $L_{LAN}$ of the $LAN_5$ (step S502). Thereafter, the processor 102 creates an update request message $MSG_{RQ}$ including the host address $HA_{RCV}$ of the host #04 and the location information $L_{LAN}$ of the $LAN_5$ and then sends the update request message $MSG_{RQ}$ to all routing nodes other than the routing node RN21 which has sent the update notifying message $MSG_{UP}$ (step S503).

At this time, the processor 102 starts the timer 104 which has been set for a predetermined time period so as to check the completion of the update operations in each of the routing nodes (step S504). The processor 102 checks whether a time-out occurs or an update completion message $MSG_C$ is received (steps S505 and S506). When the timer 104 reaches the predetermined time period (YES in step S505), it is determined that the update request message $MSG_{RQ}$ has not reached the corresponding routing node due to congestion/failure of the network or the routing node. In this case, the update request message $MSG_{RC}$ is sent to the routing node again (step S507). if the timer is reset and started in the step S507, then the update request message $MSG_{RQ}$ is sent to the routing node the permitted number of times until the update completion message $MSG_C$ has been received.

On the other hand, when each of the routing nodes other than the routing node RN21 receives the update request message $MSG_{RQ}$ from the routing server 1 (step S508), the processor 107 extracts the host address $HA_{RCV}$ from the update request message $MSG_{RQ}$ and starts searching the address learning table 108 for the host address $HA_{RCV}$ (step S509). If the received host address $HA_{RCV}$ is found in the address learning table 108 (YES in step S510), the processor 107 deletes the existing registered information for the host address $HA_{RCV}$ (step S511). Thereafter, the new address information for the host address $HA_{RCV}$ is registered onto the address learning table 108 (step S512). In the case where a new host is added to the network system, the received host address $HA_{RCV}$ is not found in the address learning table 108 (NO in step S510). Therefore, the processor 107 performs the step S512 without doing the step S511. When the address learning table 108 has been updated, the processor 107 creates an update completion message $MSG_C$ and sends it to the routing server 1 (step S513).

When the routing server 1 receives the update completion message $MSG_C$ from each of the routing nodes (YES in step S506), the processor 102 stops the timer 104 (step S514) and the update operation is completed (step S515).

It should be noted that the update operation as shown in FIG. 5 is performed only when the update notifying message $MSG_{UP}$ is received from one of the routing nodes. In other words, the update operation as shown in FIG. 5 is not performed unless a host moves to another LAN or a new host is added to the network system.

Figure 6:
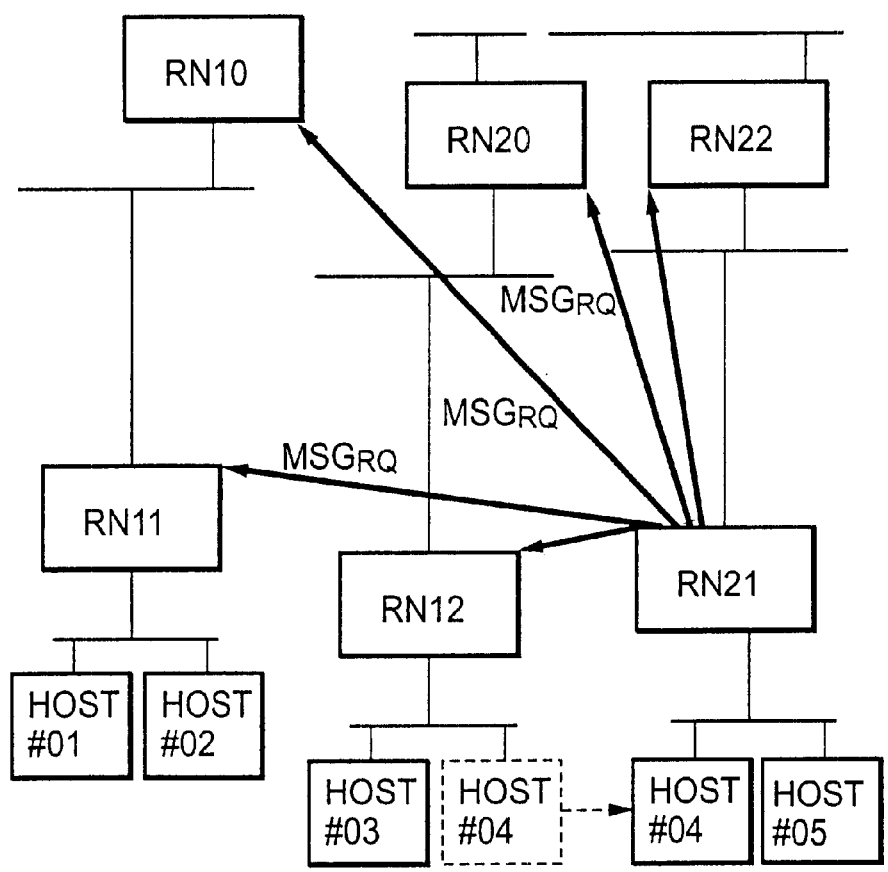
FIG. 6 is a schematic diagram showing an operation of a second embodiment of a routing address management method according to the present invention.

FIG. 6 shows a second embodiment of the present invention. According to the second embodiment, each routing node is provided with the function of the routing server 1 as shown in FIG. 5. Therefore, each routing node may be provided with a watchdog timer for re-sending an update request message. In this case, there is no need of a routing server shared by the routing nodes.

Hereafter, the second embodiment of the present invention. will be described with reference to FIGS. 4–6.

Referring to FIG. 6, similarly to the case of FIG. 3, assuming that a host #04 is disconnected from the $LAN_3$ and then is connected to the $LAN_5$. In this case, when the routing node RN21 learns from the address learning table 108 that the host #04 does not belong to the $LAN_5$ (see steps S401–S404 of FIG. 4). therefore, the address learning table 108 is updated such that the host #04 belongs to the $LAN_5$ (see step S405 of FIG. 4).

After the address learning table 108 has been updated, the processor 107 of the routing node RN21 creates an update request message $MSG_{RQ}$ including the host address $HA_{RCV}$ of the host #04 and the location information $L_{LAN}$ of the $LAN_5$ and then sends the update request message $MSG_{RQ}$ to all other routing nodes (see step S503 of FIG. 5).

At this time, the processor 107 starts the timer which has been set for a predetermined time period so as to check the completion of the update operations in each of the other routing nodes (see step S504 of FIG. 5). The processor 107 checks whether a time-out occurs or an update completion message $MSG_C$ is received (see steps S505 and S506 of FIG. 5). When the timer reaches the predetermined time period, it is determined that the update request message $MSG_{RQ}$ has not reached the corresponding routing node due to congestion/failure of the network or the routing node. In this case, the update request message $MSG_{RQ}$ is sent to the routing node again (see step S507 of FIG. 5).

On the other hand, when each of the other routing nodes receives the update request message $MSG_{RQ}$ from the routing node RN21 (see step (S508 of FIG. 5), the processor 107 extracts the host address $HA_{RCV}$ from the update request message $MSG_{RQ}$ and starts searching the address learning table 108 for the host address $HA_{RCV}$ (see step S509 of FIG. 5). If the received host address $HA_{RCV}$ is found in the address learning table 108, the processor 107 deletes the existing registered information for the host address $HA_{RCV}$ (see step S511 of FIG. 5). Thereafter, the new address information for the host address $HA_{RCV}$ is registered onto the address learning table 108 (see step S512 of FIG. 5). When the address learning table 108 has been updated, the processor 107 creates an update completion message $MSG_C$ and sends it to the routing node RN21 (see step S513 of FIG. 5).

When the routing node RN21 receives the update completion message $MSG_C$ from each of the other routing nodes, the processor 107 of the routing node RN21 stops the timer and the update operation is completed (see steps S514 and S515).

It should be noted that the update operations of the routing nodes are not performed unless a host moves to another LAN or a new host is added to the network system.

What is claimed is:

1. A routing address management method in a network system including a plurality of hosts and a plurality of networks which are connected by a plurality of routing nodes each having an address learning table storing address information for each of the hosts, wherein each of the hosts can be connected to one of the networks, comprising the steps of:

at a routing node,
    monitoring a network connected to the routing node to determine whether a new host is connected to the network;
    when it is determined that a new host is connected to the network, updating an address learning table thereof depending on new address information of the new host;
    producing a control message including the new address information after the address learning table has been updated; and
at the routing nodes other than the routing node,
    updating address learning tables thereof depending on the new address information included in the control message.

2. A routing address management method in a network system including a routing server, a plurality of hosts, and a plurality of networks which are connected by a plurality of hosts, and a plurality of networks which are connected by a plurality of routing nodes each having an address learning table storing address information for each of the hosts, wherein each of the hosts can be connected to one of the networks, comprising the steps of:

at a routing node,
 a) monitoring a network connected to the routing node to determine whether a new host is connected to the network;
 b) when it is determined that the new host is connected to the network, updating an address learning table thereof depending on new address information of the new host;
 c) sending an update notifying message to the routing server after the address learning table has been updated, the update notifying message including the new address information;

at the routing server,
 d) in response to the update notifying message sending an update request message to the routing nodes other than the routing node, the update request message including the new address information of the new host; and at the routing nodes other than the routing node,
 e) updating address learning tables thereof depending on the new address information included in the update request message.

3. The routing address management method according to claim 2, further comprising the step of:
 at each of the routing nodes other than the routing node,
  f) sending an update completion message to the routing server when an address learning table has been updated.

4. The routing address management method according to claim 3, further comprising the steps of:
 at the routing server,
  g) starting a timer set for a predetermined time period when the update request message is sent;
  h) determining whether the update completion message is received from each of the routing nodes other than the routing node;
  i) re-sending the update request message to a routing node from which the update completion message is not received until the predetermined time period has elapsed; and
  j) stopping the timer when the update completion message has been received from each of the routing nodes other than the routing node.

5. A routing address management method in a network system including a plurality of hosts and a plurality of networks which are connected by a plurality of routing nodes each having an address learning table storing address information for each of the hosts, wherein each of the hosts can be connected to one of the networks, comprising the steps of:
 at a routing node
  a) monitoring a network connected to the routing node to determine whether a new host is connected t the network;
  b) when it is determined that the new host is connected to the network, updating an address learning table thereof depending on new address information of the new host;
  c) sending an update request message to the routing nodes other than the routing node after the address learning table has been updated, the update request message including the new address information of the new host; and at the routing nodes other than the routing node,
 d) updating address learning tables thereof depending on the new address information included in the update request message.

6. The routing address management method according to claim 5, further comprising the step of:
 at each of the routing nodes other than the routing node,
  e) sending an update completion message to the routing node when an address learning table has been updated.

7. The routing address management according to claim 6, further comprising the steps of:
 at the routing node,
  f) starting a timer set for a predetermined time period when the update request message is sent;
  g) determining whether the update completion message is received from each of the routing nodes other than the routing node;
  i) re-sending the update request message to a routing node from which the update completion message is not received until the predetermined time period has elapsed; and
  stopping the timer when the update completion message has been received from each of the routing nodes other than the routing node.

8. A system comprising:
 a plurality of hosts;
 a routing server;
 a plurality of routing nodes each having an address learning table storing address information for each of the hosts; and
 a plurality of networks which are connected by the routing nodes, wherein each of the hosts can be connected to one of the networks,
 wherein each of the routing nodes comprises:
  a monitor for monitoring a network connected to the routing node to determine whether a new host is connected to the network;
  a table controller for, when it is determined that the new host is connected to the network, updating the address learning table thereof depending on new address information of the new host and, when receiving an update request message from the routing server, updating the address learning table depending on new address information of a new host included in the update request message; and
  a communication controller for sending an update notifying message to the routing server after the address learning table has been updated, the update notifying message including the new address information, and
 the routing server comprises:
  a controller for, in response to the update notifying message, sending the update request message to the routing nodes other than the routing node.

9. The system according to claim 8, wherein, in each of the routing nodes, the communication controller sends an update completion message to the routing server when the address learning table has been updated in response to the update request message.

10. The system according to claim 8, wherein, in the routing server, the controller starts a timer set for a predetermined time period when the update request message is sent, determines whether the update completion message is received from each of the routing nodes other than the routing node, re-sends the update request message to a routing node from which the update completion message is not received until the predetermined time period has elapsed, and stops the timer when the update completion message has been received from each of the routing nodes other than the routing node.

11. A system comprising:

a plurality of hosts;

a plurality of routing nodes each having an address learning table storing address information for each of the hosts; and a plurality of networks which are connected by the routing nodes, wherein each of the hosts can be connected to one of the networks, wherein each of the routing nodes comprises:

a monitor for monitoring a network connected to the routing node to determine whether a new host is connected to the network;

a table controller for, when it is determined that the new host is connected to the network, updating the address learning table thereof depending on new address information of the new host and, when receiving an update request message from another routing node, updating the address learning table depending on new address information of a new host included in the update request message; and a communication controller for sending an update request message to other routing nodes after the address learning table has been update in response to the new host, the update request message including the new address information.

12. The system according to claim 11, wherein, in each of the routing nodes, the communication controller sends an update completion message to the other routing node from which the update request message was received when the address learning table has been updated in response to the update request message.

13. The system according to claim 12, wherein, in each of the routing nodes, the controller starts a timer set for a predetermined time period when the update request message is sent to the other routing nodes, determines whether the update completion message is received from each of the other routing nodes, re-sends the update request message is not received until the predetermined time period has elapsed, and stops the timer when the update completion message has been received from each of the other routing nodes.

* * * * *